United States Patent
Kurematsu et al.

(10) Patent No.: US 9,080,641 B2
(45) Date of Patent: Jul. 14, 2015

(54) TENSIONER

(71) Applicant: Tsubakimoto Chain Co., Osaka (JP)

(72) Inventors: Yuji Kurematsu, Osaka (JP); Osamu Yoshida, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 282 days.

(21) Appl. No.: 13/892,422

(22) Filed: May 13, 2013

(65) Prior Publication Data

US 2013/0331212 A1 Dec. 12, 2013

(30) Foreign Application Priority Data

Jun. 7, 2012 (JP) .................. 2012-130119

(51) Int. Cl.
*F16H 7/08* (2006.01)

(52) U.S. Cl.
CPC ............... *F16H 7/08* (2013.01); *F16H 7/0836* (2013.01); *F16H 7/0848* (2013.01); *F16H 2007/0806* (2013.01); *F16H 2007/0812* (2013.01); *F16H 2007/0859* (2013.01)

(58) Field of Classification Search
CPC ............... F16H 2007/0806; F16H 2007/0812; F16H 2007/0859; F16H 7/08; F16H 7/0836; F16H 7/0848
USPC .......................................... 474/110
See application file for complete search history.

(56) References Cited

U.S. PATENT DOCUMENTS

| 5,967,920 | A | 10/1999 | Dembosky et al. |
| 6,053,831 | A * | 4/2000 | Boedo .......................... 474/109 |
| 7,442,138 | B2 | 10/2008 | Kurokawa et al. |
| 2003/0162614 | A1* | 8/2003 | Hashimoto .................. 474/110 |
| 2003/0236144 | A1* | 12/2003 | Seungpyo ..................... 474/110 |
| 2006/0094549 | A1* | 5/2006 | Yoshida et al. ............... 474/110 |
| 2006/0166769 | A1* | 7/2006 | Yoshida ....................... 474/110 |
| 2008/0139352 | A1 | 6/2008 | Sato et al. |

FOREIGN PATENT DOCUMENTS

| JP | 11-101317 A | 4/1999 |
| JP | 2008144840 A | 6/2008 |

* cited by examiner

*Primary Examiner* — William E Dondero
*Assistant Examiner* — Robert T Reese
(74) *Attorney, Agent, or Firm* — Howson & Howson LLP (57) ABSTRACT

In a tensioner having a housing and a plunger protruding in an advancing direction from a plunger-accommodating hole formed in the housing. The plunger has a cylindrical outer wall for sliding contact with the wall of the plunger-accommodating hole, and a tapered the rear end wall. A small clearance between the cylindrical outer wall of the plunger and the wall of the plunger-accommodating hole allows the plunger to become inclined by a small amount, which increases as the plunger advances. The angle of the taper at a boundary where the end wall meets the cylindrical outer wall is substantially equal to the maximum inclination of the plunger when the plunger is in its fully advanced condition.

10 Claims, 5 Drawing Sheets

TENSIONER

CROSS REFERENCE TO RELATED APPLICATION

The disclosure of Japanese Patent Application No. 2012-130119, filed on Jun. 7, 2012, and on which this application claims priority, is incorporated by reference.

FIELD OF THE INVENTION

This invention relates to a tensioner for applying tension to an endless, flexible, transmission medium, e.g., a transmission chain, and more specifically to a plunger that is slidable in a tensioner housing and that moves in an advancing direction or in a setback direction in accordance to fluctuating tension in the transmission medium.

The tensioner can be a hydraulic tensioner, for example, and the transmission medium can be a timing chain for transmitting rotation from a crankshaft to one or more valve-operating camshafts in an internal combustion engine.

BACKGROUND OF THE INVENTION

A conventional tensioner includes a housing with a plunger-accommodating hole, a plunger protruding from the plunger-accommodating hole and slidable therein in so that it can advance and set back in an advance/set back direction. The tensioner also includes a spring for biasing the plunger in the advancing direction. The plunger moving in the advancing direction applies a tension to a transmission medium by urging a movable guide against the transmission medium as disclosed in U.S. Pat. No. 7,442,138, granted Oct. 28, 2008.

Another known tensioner, disclosed in Japanese laid-open Patent Application 2008-144840, published Jun. 26, 2006 includes a plunger formed by a deep drawing process.

In order to make the wall of a hollow plunger thin and reduce the weight of the plunger, a material having favorable malleability so that it can be forged is preferable. The material should also be relatively soft material so that it can be cut easily. Accordingly, carbon steel is ordinarily used as the material for the plunger. However, the use of carbon steel has a drawback in that treatments such as heat treatment and rustproofing are required to impart abrasion resistance to the material after forming the plunger by forging or cutting.

A very small radial gap is formed between a circumferential wall surface of the plunger-accommodating hole of the housing and the outer circumferential surface of the plunger to allow the plunger to slide in the advancing and setback directions. In the operation of the tensioner, because of friction between the plunger and a movable guide, a force imparted to the plunger by the movable guide can cause the plunger to incline within a range dependent upon the size of the radial gap.

Figure 6:
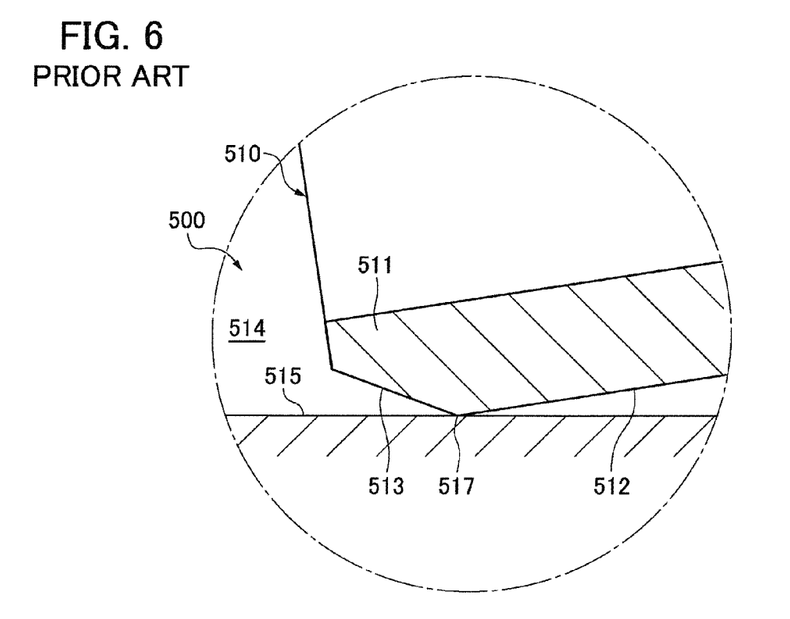
FIG. 6 is an enlarged view, showing a prior art tensioner.

As shown in FIG. 6, in a tensioner 500, if the outer circumferential surface of the rear portion of the wall 511 of the plunger 510 has a C-chamfered portion 513, and the plunger 510 is located at its most advanced position the plunger can become inclined in such a way that the corner-shaped boundary 517 between the cylindrical part 512 of the outer wall of the plunger and the chamfered portion 513 comes into contact with the circumferential wall surface 515 of the plunger-accommodating hole 514. When such contact occurs, contact pressure, i.e., Hertzian stress, at the boundary 517, and in the adjacent parts of the C-chamfered portion 513 and the cylindrical part 512, increases.

Figure 7:
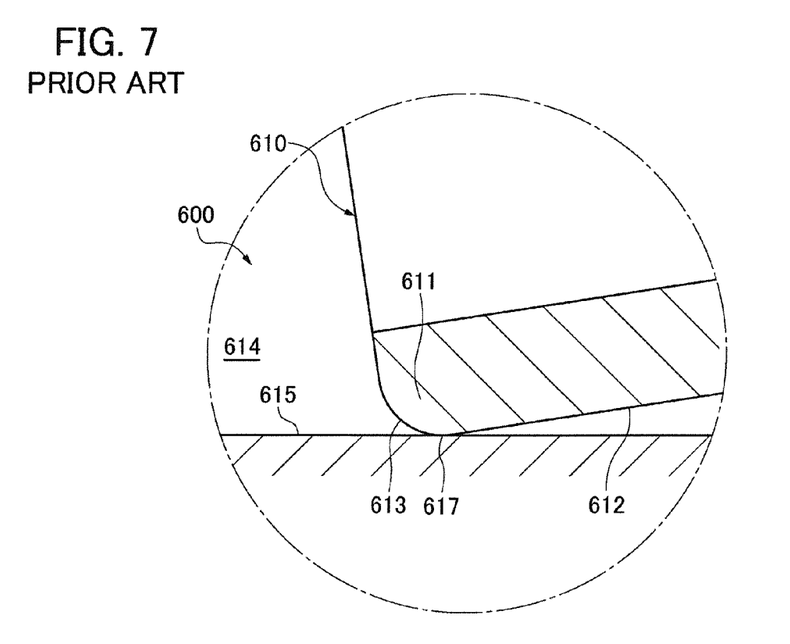
FIG. 7 is an enlarged view corresponding to FIG. 3, showing another prior art tensioner.

As shown in FIG. 7, if the outer circumferential surface of the rear portion of the wall 611 of the plunger 610 has an R-chamfered portion 613, the surface of the R-chamfered portion is substantially continuous with the cylindrical portion 612 of the plunger. If the plunger 610 is at its most advanced position the plunger can become inclined as in the case of the plunger of FIG. 6, and the contact pressure between the wall surface 615 and the boundary portion 617 increases causing Hertzian stress in the boundary portion 617 as well as in the adjacent parts of the R-chamfered portion 613 and the cylindrical portion 612.

The above-described increases in contact pressure result not only in accelerated wear of the plungers 510 and 610 but also in increased friction between the plungers 510 and 610 and the wall surfaces 515 and 615 of the plunger-accommodating holes thus reducing the ability of the plungers and 610 to slide in the advance/setback directions.

Accordingly, there is a need for a tensioner in which the durability of the plunger is improved, in which the plunger responds more rapidly to changes in tension in a transmission medium, in which the plunger can be produced at reduced cost by a deep drawing process, and in which the contact pressure at the location at which the plunger contacts the wall of the plunger-accommodating hole is reduced.

SUMMARY OF THE INVENTION

The tensioner according to the invention comprises a housing having a plunger-accommodating hole having a cylindrical wall and a central axis, and a hollow plunger located partly within the plunger-accommodating hole and protruding therefrom. The plunger has a closed front end wall located outside the plunger-accommodating hole for engagement with a movable guide for guiding a traveling transmission medium. The plunger is slidable in the plunger-accommodating hole along the central axis of the hole in an advancing direction to a fully advanced position and in a setback direction opposite to the advancing direction. Means, such as a compression spring, hydraulic fluid under pressure, or both, are provided for biasing the plunger in the advancing direction.

The plunger has a rear end wall located within the plunger-accommodating hole, a cylindrical side wall located between the front and rear end walls, and a central axis about which the cylindrical side wall is symmetrical. The cylindrical side wall has an outer circumferential surface that includes a sliding contact surface that comes into sliding contact with the cylindrical wall of the plunger-accommodating hole.

Substantially the entirety of the side wall and front end wall has a uniform thickness. The uniform thickness results from formation of the plunger by deep drawing.

The rear end wall meets the cylindrical side wall, and has an outer circumferential surface meeting the outer circumferential surface of the side wall at a boundary. This outer circumferential surface of the rear end wall extends both rearward from the boundary and inwardly from the boundary toward the central axis of the plunger. A radial gap between the side wall of the plunger and the wall of the plunger-accommodating hole permits the plunger to become inclined so that the central axis of the plunger is inclined in relation to the central axis of the plunger-accommodating hole. The inclination of the plunger can reach a maximum angle when the plunger is in it fully advanced position. This maximum angle is substantially equal to an angle, formed in a plane in which the central axis of the plunger accommodating hole lies, between an intersection of the plane with the sliding contact surface and a line in the plane tangent to the outer circumferential surface of the rear end wall at the location of the boundary.

Advantages of the first aspect of the invention include a reduction in the weight of the plunger because its wall can be made thin, avoidance of deformation of the plunger, improved sliding of the plunger, improved responsiveness of the tensioner to fluctuating tension, a cost reduction resulting from the elimination of the need for forging or cutting, and elimination of the need for treatments such as heat treatment to impart wear resistance and durability to the plunger. In addition, equalization of the angle of the taper at the boundary where the end wall meets the cylindrical outer wall with the maximum inclination of the plunger, reduces wear in the vicinity of the boundary and improves the durability of the plunger and the tensioner housing.

According to a second aspect of the invention, the outer circumferential surface of the rear end wall includes an first portion that extends rearward from the boundary and a second portion that continues rearward from the first portion. The second portion is positioned closer than the first portion to the central axis of the plunger-accommodating hole.

This arrangement makes it easy to insert the plunger into the plunger-accommodating hole in assembly of the tensioner, and contributes to a reduction in cost.

According to a third aspect of the invention, the surface roughness of the sliding contact surface is made substantially equal to the surface roughness of the first portion of the outer circumferential surface of the rear end wall.

An advantage of the third aspect of the invention is that friction between the first portion of the outer circumferential surface and the circumferential wall surface of the plunger-accommodating hole is reduced, sliding of the plunger is improved, and wear of the first portion of the outer circumferential surface and the wall is reduced.

In accordance with a fourth aspect of the invention, a rear end intersection line is composed of a first part defined by an intersection of the plane in which the central axis of the plunger-accommodating hole lies with the first portion of the outer circumferential surface of the rear end wall and a second part defined by an intersection of the plane in which the central axis of the plunger accommodating hole lies with the second portion of the outer circumferential surface of the rear end wall. The minimum value of the angle formed by the second part of the rear end intersection line with a circumferential wall intersection line defined by the intersection of said plane in which the central axis of the plunger-accommodating hole lies and the wall of the plunger-accommodating hole is greater than the maximum value of the angle formed by the first part of the rear end intersection line with said circumferential wall intersection line.

Advantages of the fourth aspect of the invention are that the contact pressure between the area around the boundary and the circumferential wall surface becomes small as the first portion of the circumferential surface of the end wall comes into contact with the circumferential wall surface when the plunger is inclined, even when the plunger is at its maximum inclination. Accordingly, it is possible to reduce wear of the area in the vicinity of the boundary and of the circumferential wall surface, and to reduce friction between the area in the vicinity of the boundary and the circumferential wall surface.

In addition, the reduced outer diameter of the second portion of the rear end wall makes it possible to insert the plunger readily into the plunger-accommodating hole in the process of assembling the tensioner.

According to a fifth aspect of the invention, both of the first and second portions of the outer circumferential surface of the rear end wall are tapered, and at least the part of the rear end wall of which the outer circumferential surface is the first portion is formed by the deep drawing. The area of contact of the area near the boundary and the circumferential wall surface increases, and the reduction in contact pressure is improved as the plunger is inclined, including the condition in which the inclination of the plunger is at its maximum. Therefore, it is possible to reduce the wear of the area around the boundary and to reduce friction between the area around the boundary portion and the circumferential wall surface.

Because at least the first portion of the outer circumferential surface of the rear end wall is formed by deep drawing work hardening takes place in the deep drawing process and no surface treatment such as heat treatment is required to impart wear resistance to the outer circumferential surface. Therefore, it is possible to improve wear resistance at a reduced cost.

According to a sixth aspect of the invention, the first and second parts of the two-part rear end intersection line are arc-shaped, outwardly convex curves. As a result the dimension of the rear end wall in the advance and setback direction can be reduced, and the outer diameter of the rear end wall at the rearmost end thereof can also be reduced. Accordingly, it is possible to reduce the length of the plunger, to reduce its weight, and to facilitate insertion of the plunger into the plunger-accommodating hole of the housing during assembly of the tensioner.

According to a seventh aspect of the invention, where the first and second parts of the two-part rear end intersection line are arc-shaped, outwardly convex curves, the radius of curvature of the first part is greater than the radius of curvature of the second part.

Here it becomes possible to increase the area of contact with the circumferential wall surface of the plunger-accommodating hole, and to reduce contact pressure, when the first part of the rear end intersection line is an arc-shaped curve. Accordingly, reduction of wear and friction in the vicinity of the boundary can be achieved. In addition, the outer diameter rearmost end of the plunger is reduced, facilitating insertion of the plunger into the plunger-accommodating hole 112.

According to an eighth aspect of the invention, a rear end intersection line is defined by an intersection of a plane in which the central axis of the plunger-accommodating hole lies with the outer circumferential surface of the rear end wall, and the rear end intersection line is an arc-shaped curve the radius of curvature of which continuously decreases proceeding in said setback direction.

Because the radius of the outer circumferential surface of the rear end wall varies continuously and smoothly without a bend, insertion of the plunge into the plunger-accommodating hole can be carried out more smoothly in the assembly of the tensioner.

DETAILED DESCRIPTION OF THE PREFERRED EMBODIMENTS

Figure 1:
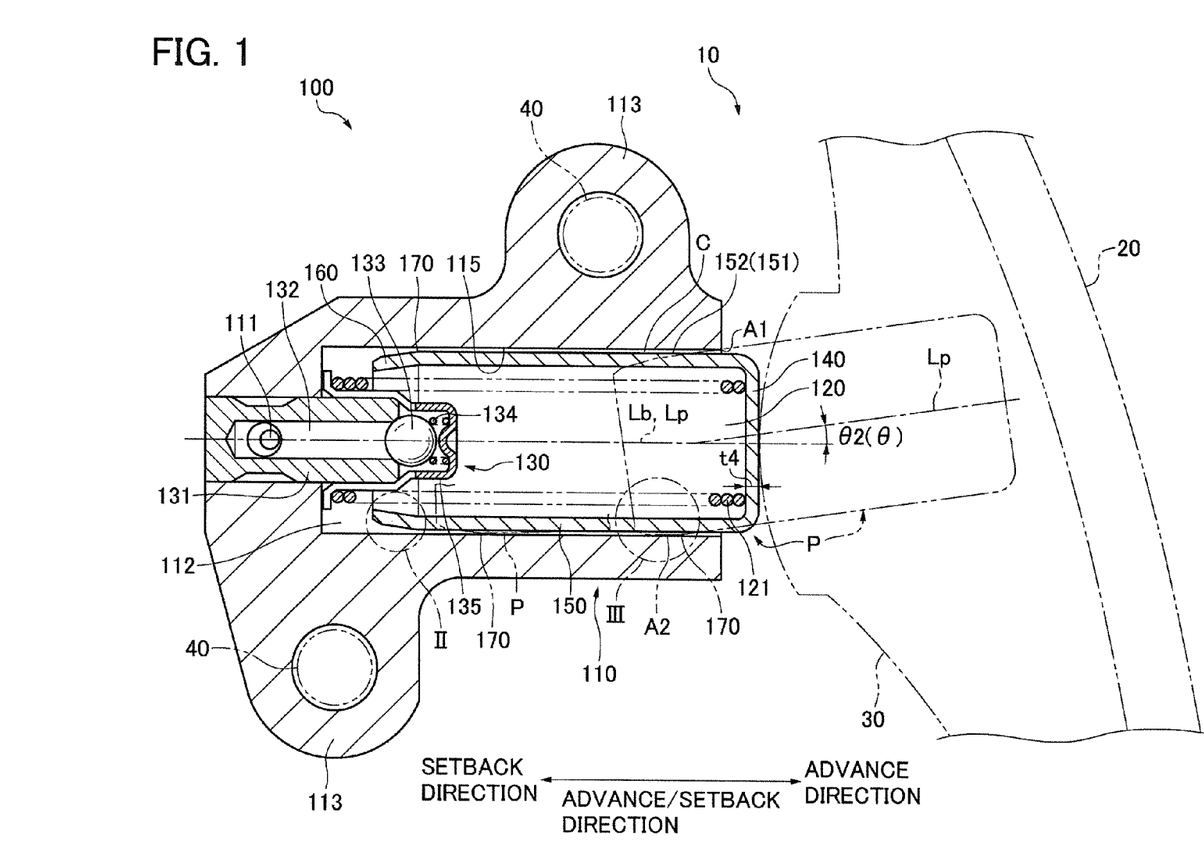
FIG. 1 is a schematic cross-sectional view of a chain transmission having a tensioner according to a first embodiment of the invention, the section being taken on a section plane in which the axis of the plunger accommodating hole of the tensioner lies.

As shown in FIG. 1, a hydraulic tensioner 100 is a component of a valve timing transmission 10 in an internal combustion engine. The valve timing transmission is used to operate the intake and exhaust valves of the engine by transmitting power, by means of an endless chain 20, from an engine crankshaft to one or more valve-operating camshafts, the chain being in meshing engagement with sprockets on the crankshaft and camshafts respectively.

A movable guide 30 guides the chain 20 and is pivotably supported on the engine block and urged by the tensioner 100a against a span of the chain 20.

The tensioner 100 includes a housing 110 provided with an oil supply passage ill and a plunger-accommodating hole 112, a cylindrical plunger P protruding from the plunger-accommodating hole in the housing and slidable in advance and setback directions. A spring 121, disposed within an oil chamber 120 formed by the housing 110 and the plunger P within the plunger-accommodating hole 112 biases the plunger P in the advance direction. A check valve 130 permits oil to flow from an oil supply into the oil chamber 120 while preventing reverse flow of oil. The housing 110 is fixed to the engine block by a bolt 40 inserted through a mounting flange 113.

The advance and setback directions of the plunger are parallel to an axial line Lb which is the central axis of the cylindrical plunger-accommodating hole 112. The axial line Lb of the hole 112 is aligned with the central axial line Lp of the cylindrical plunger P when the plunger is in its fully setback position. In this position, the plunger is not inclined, as indicated by solid lines in FIG. 1. Radial and circumferential directions are defined with reference to the axial line Lb, or the axial line Lp when it coincides with axial line Lb.

The check valve 130 is built into the housing 110, and disposed within the oil chamber 120. The check valve is composed of a ball seat 131 having a valve oil passage 132 through which oil flows, a check ball 133 that opens and closes the valve oil passage 132 by separating from and seating on the ball seat 131, a valve spring 134 that biases the check ball 133 toward the ball seat 131, and a retainer 135 that surrounds the check ball 133 and limits movement of the check ball.

The movable guide 30 oscillates in response to a biasing force imparted to it, through the plunger P, by spring 121, and a reaction force imparted to it by the chain 20 with which the guide 30 is in sliding contact.

The plunger P is movable between a fully setback position (indicated by solid lines in FIG. 1) and a fully advanced position (indicated by a broken line in FIG. 1). The fully setback and fully advanced positions are the limits of the operating range of the plunger of the tensioner.

The plunger P advances when tension of the chain 20 decreases or when the chain 20 elongates, thereby restoring tension in the chain through the movable guide 30. The plunger P sets back due to a reaction force applied to it by the chain 20 through the guide when the tension in the chain increases, thereby reducing tension in the chain. When the tension in the chain increases and the plunger sets back, oil leaks from the oil chamber through a small radial gap C between the cylindrical wall of the plunger-accommodating hole 112 and the plunger P, thereby exerting a damping action which attenuates vibration of the chain.

Figure 2:
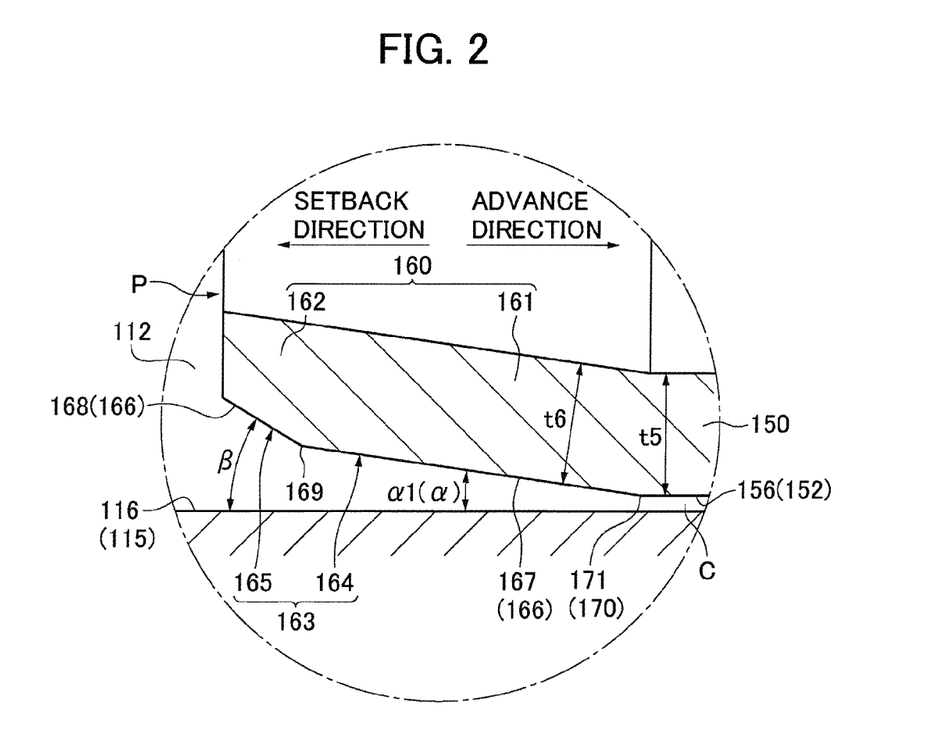
FIG. 2 is an enlarged view of a part of the tensioner within a broken line circle II in FIG. 1.

As shown in FIGS. 1 and 2, the plunger P is composed of a disc-shaped front end wall 140 that is in contact with the movable guide 30, a tapered rear end wall 160, located within the plunger-accommodating hole 112, and a cylindrical side wall 150, which extends from wall 140 to wall 160 along the advance and setback directions.

A part of the plunger that includes the end wall 140 protrudes from the plunger-accommodating hole even when the plunger is fully set back. The end wall 140 not only presses the movable guide 30 but also closes the oil chamber 120.

The side wall 150 has a cylindrical outer circumferential surface 151 that includes a part 152 that comes into sliding contact with the circumferential wall surface 115 of the plunger-accommodating hole 112 as the plunger slides in the advance and setback directions. The sliding contact surface 152 can be substantially the entire outer circumferential surface 151. The term "substantially," when used herein as a modifier, is intended to signify that the word or expression so modified encompasses a range in which there is no significant difference insofar as operation and effect are concerned.

The circumferential wall surface 115 of the plunger-accommodating hole and the sliding contact surface 152 are substantially cylindrical, i.e., columnar, surfaces, and the circumferential wall surface 115 and the sliding contact surface 152 are both substantially parallel to the axial line Lb when the plunger is in its non-inclined condition.

As shown in FIG. 2, the rear end wall 160 has an outer circumferential surface 163, all of which, except for the part that meets the sliding contact surface 152, is located closer than surface 152 to the plunger axis. Wall 160 forms an end opening that leads to the interior of the plunger. The outer circumferential surface of the plunger consists of circumferential surfaces 151 and 163.

As shown in FIG. 2, and partly in FIG. 1, the rear end wall 160 has a part 161, which is continuous with side wall 150 and extends therefrom in the setback direction, and a part 162, which is continuous with part 161 and extends therefrom in the setback direction. The outer circumferential surface 163 of the rear end wall 160 is composed an outer circumferential surface 164 of part 161 and an outer circumferential surface 165 of part 162. Surfaces 164 and 165 meet at a bend 169.

Surfaces 164 and 165 are both tapered surfaces of revolution symmetrical about the central axial line Lp of the plunger. Outer circumferential surface 164 is continuous with the sliding contact surface 152 at a boundary 170, where the two surfaces meet.

The front end wall 140, the main part of the side wall 150 and the rear end wall 160 of the plunger P are formed by deep drawing of a plate of metal, e.g., stainless steel, followed by subsequent treatments. The thickness t4 of the front end wall 140, the thickness t5 of the side wall 150, and the thickness t6 of the rear end wall 160 are made substantially equal. The side wall can include portions having a thickness different than thickness t5. For example, in the case of ratchet tensioner, the side wall of the plunger can be formed with rack teeth for restricting setback movement of the plunger, and in such a case the thickness at the location of the rack teeth can vary.

The rear end wall 160 is tapered by plastic working of the plunger in the subsequent treatments following the deep drawing step. The subsequent treatments may also include cutting and removal of unnecessary parts.

The outer circumferential surface 164 of the rear wall 160, shown in FIG. 2, is formed in the deep drawing step. Therefore, the surface roughness of the sliding contact surface 152 is substantially equal to the surface roughness of the outer circumferential surface 164. The outer circumferential surface 165 is formed by machining, e.g., cutting or grinding, in the subsequent treatments following the deep drawing step.

If plastic working step used to shape the rear end wall 160 rolling, the surface roughness of the outer circumferential surface 164 can be made lower than the surface roughness of the same part when formed by the deep drawing of the plunger P Therefore, it is possible to reduce the frictional force between the outer circumferential surface 164 and the circumferential wall surface 115.

Figure 3:
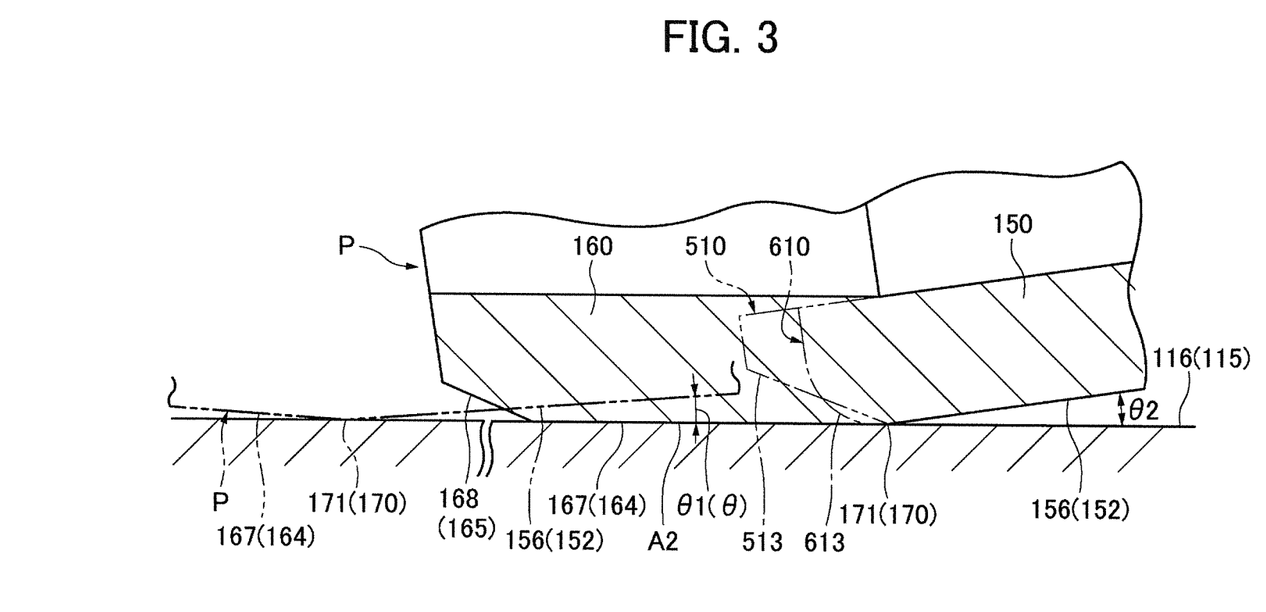
FIG. 3 is an enlarged view showing the same part of the plunger as shown in FIG. 2, when the plunger is advanced to a location such that said part of the plunger is within a broken line circle III in FIG. 1.

Referring to FIG. 3, a circumferential wall intersection line 116 is defined by the intersection of a plane containing the axial line Lb of the plunger-accommodating hole (the plane being referred to as an "axial-line plane" hereinafter) with the circumferential wall surface 115. Similarly, when the plunger P is not inclined, a sliding-contact intersection line 156 is defined by the intersection of the aforementioned axial-line plane with the sliding contact surface 152. A rear end intersection line 166 is defined by the intersection of the axial-line plane with the outer circumferential surface 163. These intersection lines can be at an arbitrary circumferential position.

The rear end intersection line 166 is composed of two parts: an intersection line 167, defined by the intersection of the axial-line plane with outer circumferential surface 164, and an intersection line 168, defined by the intersection of the axial-line plane with the outer circumferential surface 165.

The sliding-contact intersection line 156 and the circumferential wall intersection line 116 are substantially parallel to each other and to the axial line Lb. Each of the intersection lines 116, 156, 167, and 168 is a single straight line in the present embodiment, and these lines are coplanar in an axial line plane.

As shown in FIG. 2, when the plunger is not tilted, intersection line 167 forms an acute angle α with the circumferential wall intersection line 116 in a common axial-line plane. Proceeding in the setback direction, the intersection line 167 is inclined radially inward with respect to the circumferential wall intersection line 116. A specific interface angle α1 is an interface angle α at an intersection 171 where the sliding-contact intersection line 156 intersects the intersection line 167. The intersection 171 is located at a part of boundary 170 on the axial-line plane in which the intersection lines are defined.

In a similar manner, intersection line 168 forms an acute angle β with the circumferential wall intersection line 116 in common axial-line plane. Proceeding in the setback direction, the intersection line 168 is inclined radially inward with respect to the circumferential wall intersection line 116

In the embodiment shown in FIGS. 2 and 3, the angle α is a constant angle along the entire intersection line 167, and the angle β is also a constant angle along the entire intersection line 168. The angle β is greater than the angle α, so that it can be said that the minimum value of β is greater than the maximum value of α. The angles α and β are also angles formed by intersection lines 167 and 168 respectively with the sliding-contact intersection line 156.

The diameter of the sliding-contact surface 152, that is, the outer diameter of plunger P at the sliding-contact surface 152, is slightly smaller than the diameter of the circumferential wall surface 115 of the plunger-accommodating hole 112 in order to allow the plunger P to slide with respect to the housing 110. Therefore, a very small annular radial gap C is formed around the circumference of the sliding-contact surface 152 between the plunger P and the circumferential wall surface 115 when the plunger is not inclined. The gap C is exaggerated in FIGS. 1 and 2.

As shown in FIG. 1, the plunger P can be in an inclined condition in which its axial line Lp is inclined with respect to the axial line Lb of the plunger-accommodating hole by an angle θ. The inclination of the plunger occurs because, as the movable guide 30 pivots while the plunger advances, the area of contact between the front end wall of the plunger and the guide moves away from axial line Lb and friction between the front end wall of the plunger and the guide causes the plunger to tilt. The range of the tilt of the plunger depends on the size of the radial gap C. The inclination of the plunger is limited by contact between the sliding-contact surface 152 of the plunger and the circumferential wall surface 115 of the plunger-accommodating hole at contact sites A1 and A2 as shown in FIG. 1. Contact site A2 is also shown in FIG. 3.

The inclination of the plunger can be large, as indicated by the broken line depiction of the plunger in FIG. 1, when the plunger is fully advanced. The inclination of the plunger can be smaller than its maximum inclination, as indicated by the bold broken line in FIG. 3, when the plunger is partially advanced.

The smaller inclination angle θ1 is less than the maximum inclination angle θ2. The inclination angle becomes larger as the plunger P moves toward its maximum advanced condition. At the same time, as the plunger advances, the contact pressure, i.e., Hertzian stress, between the wall surface 115 and surfaces 164 and 152 near boundary 170 increases.

The specific interface angle α1 is substantially equal to the large inclination angle θ2. Therefore, as shown in FIG. 3, surface 164, which includes the boundary 170, comes into contact with the circumferential wall surface 115 of the plunger-accommodating hole over substantially the entire length of surface 164 when the plunger is in its fully inclined condition. Here the angle formed by intersection line 167 with the circumferential wall intersection line 116 is substantially zero.

Even when the plunger is in a partly inclined condition as indicated by the bold broken line in FIG. 3, the contact area of the boundary 170 with the circumferential wall surface 115 also increases and the contact pressure at the boundary becomes small compared to the contact pressure in the cases of the C-chamfered plunger wall in FIG. 6 and the R-chamfered plunger wall in 7, also indicated respectively by two-dot and one-dot thin broken lines in FIG. 3. In the case of the R-chamfered plunger wall in FIG. 6, the angle corresponding to the specific angle α1 (FIG. 2) is greater than the angle of inclination of the plunger when the plunger 510 is fully advanced, so that the C-chamfered portion 513 form an angle greater than 0 DEGREES with a line of intersection of an axial-line plane with a circumferential wall surface 515 even when the inclination of the plunger reaches a maximum. In the case of the C-chamfered plunger wall in FIG. 7, the intersection of the axial-line plane with the sliding-contact surface 612 and the intersection of the axial-line plane with the R-chamfered portion 613 at a boundary 617 are located substantially on a straight line. Consequently, the contact pressure in both cases becomes large.

In the tensioner in FIGS. 1-3, the outer circumferential surface 165 extends toward the axial line Lp of the plunger from surface 164 and therefore cannot come into contact with the circumferential wall surface 115 whether or not the plunger is inclined. Moreover, the minimum value of the angle β formed by the intersection line 168 and the circumferential wall intersection line 116 is greater than the maximum value of the interface angle α formed by the intersection line 167 and the circumferential wall intersection line 116. Each of these features facilitates assembly of the tensioner by making it easy to insert the plunger into the plunger accommodating hole 112, and thereby contributes to reduction of the cost of the tensioner 100.

As noted previously, the thicknesses, t5, and t6 of the front end wall 140, the side wall 150 and the rear end wall 160 are made substantially equal by forming the plunger by deep drawing. Consequently it is possible to reduce the weight of the plunger by thinning its walls and also to reduce its cost compared to that of a plunger formed by forging or cutting. Reduction of the weight of the plunger also improves its ability to respond rapidly to fluctuations in chain tension.

Work hardening of the walls 140, 150 and 160 of the plunger is achieved in the deep drawing process. Therefore it becomes unnecessary to implement subsequent treatments such as a heat treatment to impart wear resistance to the plunger P. Thus, it is possible to improve the wear resistance and durability of the plunger while at the same time reducing its cost. When stainless steel is used as the material for forming the plunger it is also unnecessary to implement the rust-proofing process needed when the plunger is formed of carbon steel. Thus a further cost reduction can be achieved.

Formation of the plunger by deep drawing also suppresses deformation of the plunger, thereby improving its ability to slide smoothly in the plunger-accommodating hole and to respond rapidly to changes in chain tension.

The large inclination angle θ2, formed when the plunger P is fully advanced and inclined, is substantially equalized with the value of angle α1 formed by the intersection lines 167 and 116 substantially in parallel with the axial line Lb. Because θ2 is substantially equal to α1, when the plunger P is fully inclined the area of contact of the boundary 170 with the circumferential wall surface 115 increases and the contact pressure becomes small compared to the contact pressure in the cases of FIGS. 5 and 6. Therefore, the area around the boundary 170 and the circumferential wall surface 115 wear less, and the durability of the plunger and the tensioner housing is improved. The contact pressure is also reduced when the plunger is inclined to an extent less than its full inclination.

Formation of the plunger by deep drawing ensures that the surface roughness of surface 164 is substantially equal to the surface roughness of the sliding contact surface 152. Accordingly, friction between surface 164 and the wall surface 115 is reduced, improving the responsiveness of the plunger even when it is in a tilted condition, and reducing wear of surface 164 and wall surface 115. In addition, because the plunger is formed by deep drawing, no special steps are required to adjust the roughness of surface 164, so that a further cost reduction can be realized.

Figure 4:
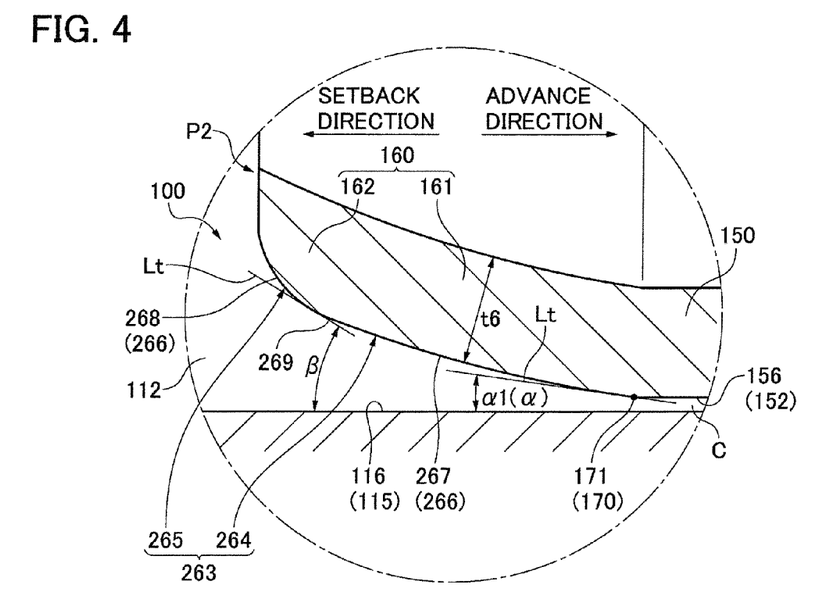
FIG. 4 is an enlarged view corresponding to FIG. 2, showing a second embodiment of the invention.

In a second embodiment, shown in FIG. 4, outer circumferential surface 264 is a surface of revolution in which intersection line 267 is a convex arc-shaped curve. The outer circumferential surface 265 is a surface of revolution in which the intersection line 268 is also a convex arc-shaped curve having a radius of curvature smaller than the radius of curvature of intersection line 267.

The outer circumferential surface 263 is therefore a two-part surface composed of surfaces 264 and 265 which are continuous with each other and meet at a connecting location 269 formed by the outer circumferential surfaces 264 and 265. Intersection lines 267 and 268, therefore compose a rear end intersection line 266. The radius of curvature of the intersection line 267 is greater than the thickness t6 of the plunger wall. As the radius of curvature becomes larger, the contact pressure in the vicinity of the boundary 170 is reduced.

In FIG. 4, angle α is an angle formed by a tangent line Lt at each point on the advance-side intersection line 267. Tangent line Lt is inclined inward toward the axial line of the plunger-accommodating hole, proceeding in the setback direction.

In the same manner, a setback-side interface angle α is formed by a tangent line Lt at each point on the intersection line 268 with the circumferential wall intersection line 116. The tangent line Lt is inclined in such a way that, proceeding in the setback direction, the distance between the tangent line and intersection line 116 becomes greater.

A specific interface angle α1 which is the value of angle α at location 171 where surface 264 meets sliding contact surface 152 is substantially equal to the inclination angle θ2 (see FIG. 3) when the plunger P2 is in its fully inclined condition.

The minimum value of the angle B, formed between tangent Lt on surface 265 is greater than the maximum value of angle α.

In the embodiment shown in FIG. 4, the intersection lines 267 and 268 are arcs each having a constant radius. However, in alternative embodiments, either or both of these intersection lines 267 and 268 may be in the form of a complex curve composed of arcs having different radii or a continuously varying radius.

Surface 265 is farther than surface 264 from wall surface 115 of the plunger-accommodating hole so that remains out of contact with wall surface 115 whether or not the plunger P2 is inclined.

Because intersection lines 267 and 268 are arc-shaped curves angles α and β both increase, proceeding in the setback direction. It is possible to reduce the width of the rear end wall 160 in the advance and setback directions and to reduce the outer diameter of the rear end wall 160 at its outer circumferential surface 265. Accordingly, it is possible to reduce the size of the plunger in the advance and setback direction, to reduce the weight of the plunger, and to facilitating assembly as the plunger P can be readily inserted into the plunger-accommodating hole 112.

Because the radius of the intersection line 267 is greater than the radius of the intersection line 268, it is possible to increase the area of contact with the circumferential wall surface 115 and to reduce the contact pressure at the outer circumferential surface 264 even though the intersection line 267 is an arc-shaped curve. Accordingly, it is possible to reduce wear of the area in the vicinity of the boundary 170 and the circumferential wall surface 115, and to reduce friction between the area in the vicinity of the boundary 170 and the circumferential wall surface 115.

The small radius of the intersection line 268 also results in a reduction of the outer diameter of the 162 at the rear end of the plunger and facilitates insertion of the plunger into the plunger accommodating hole.

Figure 5:
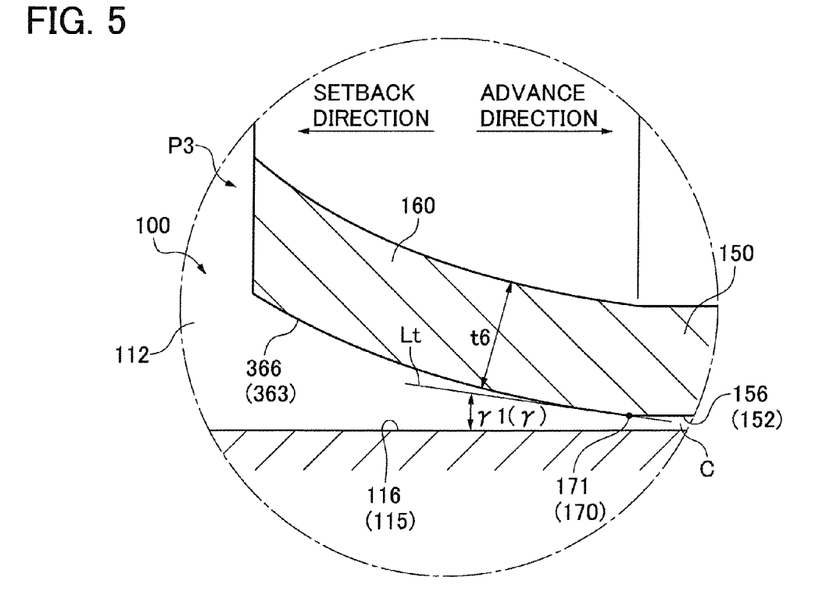
FIG. 5 is an enlarged view corresponding to FIG. 2, showing a third embodiment of the invention.

In a third embodiment, shown in FIG. 5, the outer circumferential surface 363 of the rear end wall 160 of a plunger P is a surface of revolution in which a rear end intersection line 366 is an arc-shaped convex curve the radius of curvature of which decreases continuously proceeding in the setback direction from the location 171 where the curve meets the sliding contact surface 152.

The maximum radius of the intersection line 366 is greater than the thickness t6 of the plunger wall, in order to reduce the contact pressure in the vicinity of the boundary 170.

The angle γ is formed by a tangent line Lt and intersection line 116 on the inner wall of the plunger-accommodating hole. The tangent line is inclined so that, proceeding in the setback direction, the tangent line becomes farther away from intersection line 116. A specific angle γ1 is the value of angle γ for a tangent at the point 171 at which intersection line 366 meets sliding contact intersection line 156. Angle γ1 is substantially equal to the maximum inclination angle θ2 when the plunger P3 is in its maximum inclined condition and is the minimum value of angles γ.

Because the intersection line 366 is an arc-shaped curve the radius of which decreases reduced continuously proceeding in the setback direction, the outer circumferential surface 363 of the rear end wall 160 is smooth and lacks an abrupt bend. Accordingly, it is possible to improve the smoothness of insertion of the plunger into the plunger accommodating hole in the assembly of the tensioner.

Although the outer circumferential surface 163 and 263 of the respective first and second embodiments are each composed of two steps they may be composed of three or more steps. In addition, one of the intersection lines 167 and 168 in the first embodiment may be an arc-shaped curve while the other is a straight line. In the third embodiment intersection line 366 may be an arc-shaped curve having a constant radius of curvature.

The tensioner of the invention may be either a hydraulic tensioner, or a mechanical, i.e., non-hydraulic tensioner. The tensioner can be used not only in an automobile engine timing drive, but in industrial machinery and other kinds of machines having a traveling transmission medium requiring a tensioner.

The transmission medium to which tension is applied by the tensioner can be any endless flexible transmission medium such as a chain or a transmission belt.

What is claimed is:

1. A tensioner comprising:
a housing having a plunger-accommodating hole having a cylindrical wall and a central axis;
a hollow plunger located partly within said plunger-accommodating hole and protruding from said hole, said plunger having a closed front end wall located outside said plunger-accommodating hole for engagement with a movable guide for guiding a traveling transmission medium, said plunger being slidable in said hole along said central axis in an advancing direction to a fully advanced position and in a setback direction opposite to said advancing direction; and
means for biasing the plunger in the advancing direction;
wherein the plunger has a rear end wall located within the plunger-accommodating hole, said rear end wall comprising an inner circumferential surface and an outer circumferential surface, and a cylindrical side wall located between the front and rear end walls and a central axis about which the cylindrical side wall is symmetrical;
wherein the cylindrical side wall has an outer circumferential surface including a sliding contact surface that comes into sliding contact with the cylindrical wall of the plunger-accommodating hole, and an inner circumferential surface;
wherein substantially the entirety of the side wall and front end wall has a uniform thickness resulting from formation of the plunger by deep drawing;
wherein said rear end wall meets the cylindrical side wall, and the outer circumferential and inner circumferential surfaces of the rear end wall meet the respective outer and inner circumferential surfaces of the side wall at a boundary, and the outer and inner circumferential surfaces of the rear end wall extend both rearward and inward from said boundary toward the central axis of the plunger;
wherein a radial gap between the side wall of the plunger and the wall of the plunger-accommodating hole permits the plunger to become inclined so that the central axis of the plunger is inclined in relation to the central axis of the plunger-accommodating hole;
wherein the inclination of the plunger can reach a maximum angle when the plunger is in its fully advanced position; and
wherein said maximum angle is substantially equal to an angle, formed in a plane in which the central axis of the plunger accommodating hole lies, between an intersection of said plane with said sliding contact surface and a line in said plane tangent to said outer circumferential surface of the rear end wall at the location of said boundary.

2. The tensioner according to claim 1, wherein the outer circumferential surface of the rear end wall includes an first portion that extends rearward from said boundary and a second portion that continues rearward from the first portion, and the second portion is positioned closer than said first portion to said central axis of the plunger-accommodating hole.

3. The tensioner according to claim 2, wherein the surface roughness of said sliding contact surface is substantially equal to the surface roughness of said first portion of the outer circumferential surface of said rear end wall.

4. The tensioner according to claim 3, wherein a rear end intersection line is composed of a first part defined by an intersection of said plane in which the central axis of the plunger-accommodating hole lies with said first portion of the outer circumferential surface of said rear end wall and a second part defined by an intersection of said plane in which the central axis of the plunger accommodating hole lies with said second portion of the outer circumferential surface of said rear end wall, and wherein the minimum value of the angle formed by said second part of the rear end intersection line with a circumferential wall intersection line defined by the intersection of said plane in which the central axis of the plunger-accommodating hole lies and said wall of the plunger-accommodating hole is greater than the maximum value of the angle formed by said first part of the rear end intersection line with said circumferential wall intersection line.

5. The tensioner according to claim 1, wherein the outer circumferential surface of the rear end wall includes an first portion that extends rearward from said boundary and a second portion that continues rearward from the first portion, and the second portion is positioned closer than said first portion to said central axis of the plunger-accommodating hole, and wherein both of said first and second portions of the outer circumferential surface of said rear end wall are tapered, and wherein the part of said rear end wall of which the outer circumferential surface is said first portion is formed by the deep drawing.

6. The tensioner according to claim 1, wherein the outer circumferential surface of the rear end wall includes an first portion that extends rearward from said boundary and a second portion that continues rearward from the first portion, and the second portion is positioned closer than said first portion to said central axis of the plunger-accommodating hole, wherein the surface roughness of said sliding contact surface is substantially equal to the surface roughness of said first portion of the outer circumferential surface of said rear end wall, and wherein both of said first and second portions of the outer circumferential surface of said rear end wall are tapered, and wherein the part of said rear end wall of which the outer circumferential surface is said first portion is formed by the deep drawing.

7. The tensioner according to claim 1, wherein the outer circumferential surface of the rear end wall includes an first portion that extends rearward from said boundary and a second portion that continues rearward from the first portion, and the second portion is positioned closer than said first portion to said central axis of the plunger-accommodating hole; wherein the surface roughness of said sliding contact surface is substantially equal to the surface roughness of said first portion of the outer circumferential surface of said rear end wall; wherein a rear end intersection line is composed of a first part defined by an intersection of said plane in which the central axis of the plunger-accommodating hole lies with said first portion of the outer circumferential surface of said rear end wall and a second part defined by an intersection of said plane in which the central axis of the plunger accommodating hole lies with said second portion of the outer circumferential surface of said rear end wall, and wherein the minimum value of the angle formed by said second part of the rear end intersection line with a circumferential wall intersection line defined by the intersection of said plane in which the central axis of the plunger-accommodating hole lies and said wall of the plunger-accommodating hole is greater than the maximum value of the angle formed by said first part of the rear end intersection line with said circumferential wall intersection line; and wherein both of said first and second portions of the outer circumferential surface of said rear end wall are tapered, and wherein the part of said rear end wall of which the outer circumferential surface is said first portion is formed by the deep drawing.

8. The tensioner according to claim 1, wherein the outer circumferential surface of the rear end wall includes an first portion that extends rearward from said boundary and a second portion that continues rearward from the first portion, and the second portion is positioned closer than said first portion to said central axis of the plunger-accommodating hole; and wherein a rear end intersection line is composed of a first part defined by an intersection of said plane in which the central axis of the plunger-accommodating hole lies with said first portion of the outer circumferential surface of said rear end wall and a second part defined by an intersection of said plane in which the central axis of the plunger accommodating hole lies with said second portion of the outer circumferential surface of said rear end wall, and wherein the first and second parts of said rear end intersection line are arc-shaped, outwardly convex curves.

9. The tensioner according to claim 8, wherein the radius of curvature of the first part of said rear end intersection line is greater than the radius of curvature of the second part of said rear end intersection line.

10. The tensioner according to claim 1, wherein a rear end intersection line is defined by an intersection of said plane in which the central axis of the plunger-accommodating hole lies with said outer circumferential surface of said rear end wall, and wherein said rear end intersection line is an arc-shaped curve the radius of curvature of which continuously decreases proceeding in said setback direction.

\* \* \* \* \*